June 2, 1931.　　　　H. HUBER　　　　1,808,720

COUNTING MECHANISM FOR CALCULATING MACHINES AND THE LIKE

Filed March 17, 1926

INVENTOR:
Hans Huber
by Henry Orth Jr.
Atty

Patented June 2, 1931

1,808,720

UNITED STATES PATENT OFFICE

HANS HUBER, OF ZURICH, SWITZERLAND

COUNTING MECHANISM FOR CALCULATING MACHINES AND THE LIKE

Application filed March 17, 1926, Serial No. 95,341, and in Switzerland March 25, 1925.

In calculating machines the mechanism for indicating the result of the different denominations must be actuated from two different points, firstly from the driving members for the respective denomination and secondly from the mechanism effecting the transfer of the tens of the next lower denomination. It is known to use differential gears for this two-fold drive and such differential gears are also used with the subject matter of the present invention. In contradistinction to the known mechanisms for effecting the transfer of the tens and for indicating the result the mechanism according to the present invention contains only ordinary gear wheels cooperating as the train of gear wheels of a clock and there are no spring means provided for the transfer of the tens.

Figure 2:
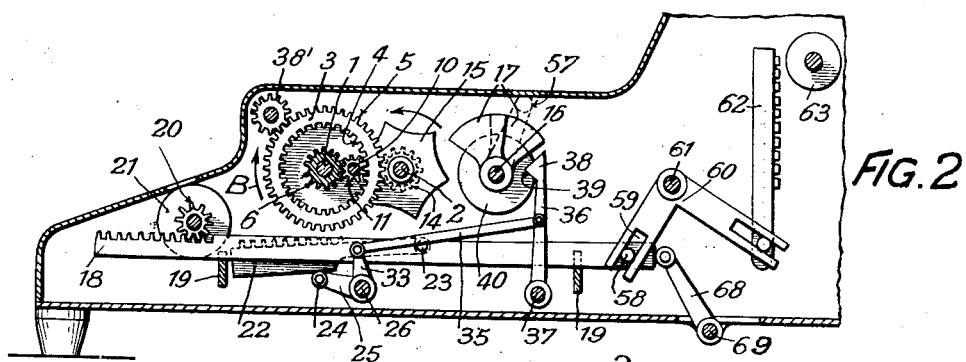
Figure 1:
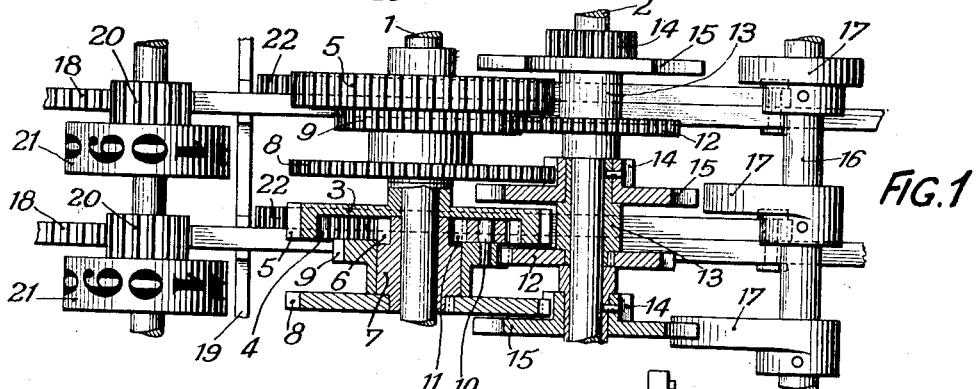
Figure 3:
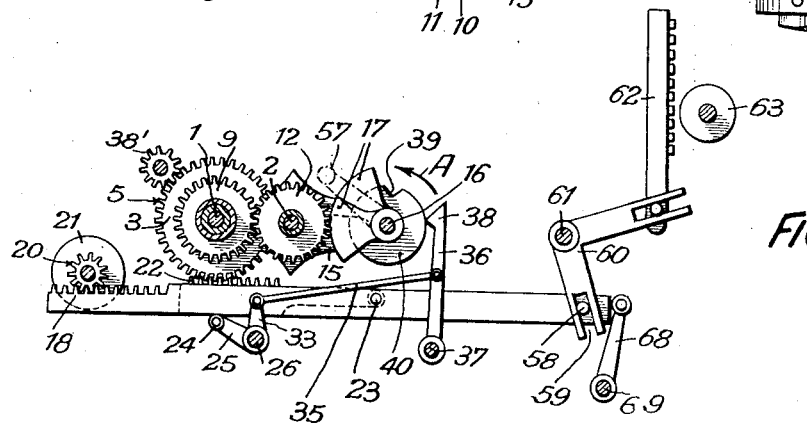

The device according to the invention may be used with several types of the known calculating machines and the embodiment of the invention illustrated in the accompanying drawings shows only the parts necessary for explaining the invention. In the drawings Fig. 1 is a plan view of the device with parts shown in a horizontal section, Figs. 2 and 3 show the device on a smaller scale in elevation with the parts in two different working positions.

In the frame containing the device for effecting the transfer of the tens of the calculating machine two parallel stationary axles 1 and 2 are provided on which for every denomination a group of gear wheels are loosely mounted with the exception of the gear wheel 6 of the first denomination which is fixed on the axle 1. To simplify the following description the gear wheels and other members belonging to the first denomination are designated by "(1)" placed after the numeral indicating the respective part; the parts of the second denomination are designated by "(2)" and so on so that for instance gear wheel 6(2) denotes the gear wheel 6 of the second denomination.

Every group of wheels comprises a wheel 3 having a boss and provided with interior teeth 4 and exterior teeth 5, and further a pair of gear wheels 6 and 8 rigidly connected together by a boss 7 common to both and loosely turnable on the stationary axle 1 except in the first denomination in which the wheels 6 and 8 are fixed to the axle 1. On the boss 7 a gear wheel 9 is loosely mounted and it carries a pin 10 for a planetary wheel 11, which meshes with the toothings 4 and 6.

On the axle 2 three wheels, i. e. the gear wheels 12 and 14 and the star wheel 15 are rigidly connected to each other by a common boss 13. The gear wheel 12 meshes with the loose gear wheel 9 and the gear wheel 14 with the gear wheel 8 of the next higher denomination. The drive of the device is effected by means of a gear wheel 38' meshing with the toothing 5 of the wheel 3.

If now the driving mechanism of the calculating machine causes a turning motion of gear wheel 38' and thereby of the gear wheel 3(1) in any direction, the latter causes by the interior toothing 4 the planetary wheel 11(1), which rolls on the fixed gear wheel 6(1) to take part in the turning movement whereby the gear wheel 9(1) carrying the pin 10 is turned. The turning motion of the gear wheel 9(1) causes the wheel 12(1) and the wheels 14(1) and 15(1) rigidly connected to the wheel 12 to turn. The wheel 14(1) imparts turning motion to the wheel 8(2) and thereby to the wheel 6(2), which causes a turning movement of the planetary wheel 11(2). By the latter the wheel 9(2) and further the wheels 12(2), 14(2) and 15(2) are turned and so on.

With calculating machines working on the decimal system the ratio between the above described gear wheels is so determined that to an angular displacement of the wheel 3(1) by one tooth of the exterior toothing 5 corresponds an angular displacement of the star wheel 15(1) by one tenth of a tooth and vice versa and that to an angular displacement of one tenth of a tooth of the star wheel 15(1) an angular displacement by one hundredth of a tooth of the star wheel 15(2) corresponds, which displacement is caused by the wheels 14(1), 8(2), 6(2), 11(2), 9(2) and 12(2). In the following the angular displacement of the star wheel 15 by one tenth of a tooth may be called "one pitch". If this wheel has been displaced from the zero position indicated in Fig. 3 by 10 pitches (i. e. by one tooth) it is again in the position illustrated, i. e. in a zero position; during one revolution this star wheel passes thus six times its zero positions.

A further axle 16 carries segments 17 adapted to enter into the arc-shaped recesses of the star wheels 15 when the axle 16 is turned and to return thereby the star wheels 15 in to their initial positions indicated in Fig. 3. The different segments 17 (one for each denomination) are angularly displaced on the axle 16 to over lap so that when the latter is turned in the direction of the arrow A (Fig. 3) the star wheels 15 are not simultaneously returned into their initial position but one after the other beginning with the star wheel of the counter for the figures of the lowest denomination of a number having several denominations. Each segment holds the lower denomination mechanism from movement until the next higher mechanism is positioned by its segment.

Below each set of the above described gear wheels a toothed rack 18 is provided and endwise displaceable in guides 19; the toothed rack 18 is continuously in mesh with the pinion 20 of an indicating device in the form of a roller 21 the circumference of which is provided with numerals. A toothed rack 22 is pivoted at 23 to the toothed rack 18 and it may be rocked into and out of engagement with the external teeth 5 of the gear wheel 3 by means of a pin 24 mounted on a lever 25 of an axle 26. At the outer end of the axle 26 a lever 33 (common to all the denominations) is fixed, to which a rod 35 is linked. The latter is pivotally connected to a pawl 36 pivoted at 37 and provided with a nose 38 adapted to engage a notch 39 of a disk 40 fixed to the axle 16. On the axle 16 a hand crank 57 is fixed which permits to turn the axle in the direction of the arrow (Fig. 3), i. e. in an anti-clockwise direction.

On an axle 69 levers 68 (one for each denomination) are fixed which cooperate with the toothed racks 18 and serve for returning the latter into their initial position (Fig. 2), when the end of rack 22 abuts guide 19.

With calculating machines arranged to type the result the toothed rack 18 cooperates by means of a pin 58 with the slot 59 in one arm of a bell crank lever 60 pivoted at 61; the other arm of the lever 60 cooperates with a type rod 62 on which the types for the numerals are arranged in a straight line. 63 denotes diagrammatically a platen cooperating with the type rod 36.

The operation of the above described device is best explained with the aid of a specific example; it may be assumed that the addition 17+85+13 has to be calculated.

After the device for indicating the result has been brought into the zero position, in which the star wheels 15 occupy the position illustrated in Fig. 3 and the toothed racks 18 have been returned into their zero position shown in Fig. 1 first of all the numeral 17 is transmitted. By means of the drive the gear wheel 38'(2) is turned by one tooth and the gear wheel 38'(1) by seven teeth in the anti-clockwise direction and thereby a corresponding turning of the wheels 3(2) and 3(1) is caused. The angular displacement of the wheel 3(2) by one tooth causes an angular displacement of the star wheel 15(2) by 1/10 of a tooth, i e. by one pitch, and of star wheel 15(3) by 1/10 of a pitch in the anti-clockwise direction; the angular displacement of the wheel 3(1) by 7 teeth causes a displacement of the star wheel 15(1) by 7 pitches, of the star wheel 15(2) by 7/10 pitches and of the star wheel 15(3) by 7/100 pitches (in the anti-clockwise direction). The differential mechanism permits a simultaneous turning of the wheels 12(2) and 12(1); after the transmission of the numeral 17 the wheel 15(1) has been turned by 7 pitches, the wheel 15(2) by 1+7/10=17/10 pitches and the wheel 15(3) by 1/10+7/100= 17/100 pitches. In a similar manner the subsequent transmission of the numeral 85 causes the following angular displacements: wheel 15(2) by 8 pitches, wheel 15(3) by 8/10 pitches, wheel 15(1) by 5 pitches, wheel 15(2) by 5/10 pitches and wheel 15(3) by 5/100 pitches. The second transmission of the numeral 85 has thus caused a further turning of the wheel 15(1) by 5 pitches, of the wheel 15(2) by 85/10 pitches and the wheel 15(3) by 85/100 pitches. In a similar manner the third transmission of the numeral 13 causes a further turning of the wheel 15(1) by 3 pitches, of the wheel 15(2) by 13/10 pitches and of the wheel 15(3) by 13/100 pitches.

The total angular displacement of the star wheels 15 is therefore:

| 0 | 15(1) | 15(2) | 15(3) |
|---|---|---|---|
|  |  |  | Pitches |
| By the addition of the numeral 17 | 7 | 17/10 | 17/100 |
| By the addition of the numeral 85 | 5 | 85/10 | 85/100 |
| By the addition of the numeral 13 | 3 | 13/10 | 13/100 |
| Total | 15 | 115/10 | 115/100 |

By an angular displacement of the star wheels 15 by 10 pitches a zero position is again reached; therefore the last zero position is exceeded by 5 pitches for the wheel 15(1), by 15/10 pitches for the wheel 15(2) and by 115/100 pitches for the wheel 15(3).

If now after the addition of these three numerals the result has to be indicated, the crank 57 is turned by hand in the anti-clockwise direction through one revolution until the nose 38 enters again the notch 39 whereby at first the parts 40, 38, 36, 35, 33 and 24 get into the position indicated in Fig. 3 in which the racks 22 mesh with the toothing 5 of the wheels 3. A rotation of the crank 57 also causes rotation of the pinions 38', the latter being free to rotate, as in calculating machines of the other types, the driving mechanism being in its position of rest out of mesh with the means indicating the result and the latter are only actuated when the driving mechanism is in its position of rest. Thereupon segment 17(1) cooperates with the star wheel 15(1) and turns the latter into the zero position i. e. returns it by 5 pitches (Fig. 3). Thereby the gear wheel 3(1) is turned by 5 teeth in the anti-clockwise direction, the toothed racks 22 and 18 are displaced towards the right causing the numeral roller 21, which at the beginning was in the zero position show now the numeral 5. By this return movement of the wheel 15(1) by 5 pitches the wheel 15(2) is returned by 5/10 pitches and the wheel 15(3) by 5/100 pitches (owing to the gear ratio), so that in the further turning of the shaft 16 when the segment 17(2) cooperates with the wheel 15(2) instead of by 15/10 the wheel 15(2) is only returned by one pitch until it reaches the zero position, thus the roller 21(2) will show the numeral 1 by the action of the racks 22(2) and 18(2). By the return movement of the wheel 15(2) the star wheel 15(3) is again displaced by 1/10 of a pitch in the clockwise direction, thus when the segment 17(3) comes to act on the star wheel 15(3) the latter has already been returned by 15/100 pitches and only to be returned by 100/100 or 1 pitch, therefore the numeral roller 21(3) will also show the numeral 1. The result on the rollers 21 is thus 115.

When carrying out a subtraction the wheels 38' are turned in the opposite direction to that described above, i. e. the wheels 38' will turn in the clockwise direction; additions and subtractions may be alternately performed in any sequence and the result will be indicated after all the numerals have been added or subtracted.

Owing to the uniform gear ratio the above described device acts free of shocks and with any desirable speed.

The device shows the feature that the wheels (15) which are displaced in accordance with the result of the calculating operation take up intermediate positions which would not yield a direct straight-line reading of the result. The measure of operatively connecting these wheels (15) with the indicating means (21) and of causing a consecutive return movement of these wheels into the zero position permits to do away with these intermediate positions and to yield the desired straight-line reading of the result, which measure I consider to be the gist of my invention.

I claim:

1. A device of the type described, comprising in combination, a plurality of individual driving gears for the different denominations, a differential gear interposed between the driving gears of adjacent denominations for the transfer of the tens adapted to rotate uniformly, individual indicating means for each denomination, means adapted to bring said indicating means into operative engagement with said driving gears, a rotatable member for each denomination and driven by the driving gear of the latter, and means operable when a result is to be indicated and cooperating with said rotatable members and adapted to return the latter consecutively, beginning with the member for the lowest denomination, into their zero position and to remove thereby the intermediate positions of the gear wheels resulting from the gear wheels of a denomination being influenced by the gear wheels of the next lower denomination and to set thereby the indicating means to show the result in a straight line.

2. A device of the type described, comprising in combination, a plurality of individual driving gears for the different denominations, a differential gear interposed between the driving gears of adjacent denominations for the transfer of the tens, individual indicating means for each denomination, means adapted to bring said indicating means into operative engagement with said driving gears, a star-wheel for each denomination and driven by the driving gear of the latter, and angularly staggered segments cooperating with said star wheels and adapted to return the latter consecutively, beginning with the star-wheel for the lowest denomination, into their zero position and to set thereby the indicating means to show the result.

3. A device of the type described, comprising in combination, a plurality of individual driving gears for the different denominations, a differential gear interposed between the driving gears of adjacent denominations for the transfer of the tens, indicating rollers for each denomination, means adapted to bring said indicating rollers into operative engagement with said driving gears, a star-wheel for each denomination and driven by the driving gear of the latter, and angularly staggered segments cooperating with said star wheels and adapted to return the latter consecutively, beginning with the star-wheel for the lowest denomination, into their zero position and to set thereby the indicating means to show the result.

4. A device of the type described, comprising in combination, a plurality of individual driving gears for the different denominations, a differential gear interposed between adjacent driving gears for the transfer of the tens, indicating rollers for each denomination having figures on their circumferences, a pinion connected to each indicating roller, a toothed rack for each denomination and cooperating with the pinion of the indicating roller, a second toothed rack pivoted to the first toothed rack, means adapted to swing the second toothed rack in and out of engagement with the respective driving gear, star wheels in operative engagement with the driving gears, and angularly staggered segments rotatably mounted and adapted to consecutively cooperate with said star-wheels for returning said star wheels into their zero positions whereby the indicating means are set to show the result, the figures of which being arranged in one line.

In testimony whereof, I have signed my name to this specification.

HANS HUBER.